(12) United States Patent
Sabripour et al.

(10) Patent No.: US 9,083,860 B2
(45) Date of Patent: Jul. 14, 2015

(54) METHOD OF AND APPARATUS FOR AUTOMATICALLY CONTROLLING OPERATION OF A USER-MOUNTED RECORDING DEVICE BASED ON USER MOTION AND EVENT CONTEXT

(71) Applicant: MOTOROLA SOLUTIONS, INC, Schaumburg, IL (US)

(72) Inventors: Shervin Sabripour, Plantation, FL (US); Michael L Charlier, Palatine, IL (US); Chi T Tran, Weston, FL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 120 days.

(21) Appl. No.: 14/049,835

(22) Filed: Oct. 9, 2013

(65) Prior Publication Data

US 2015/0098687 A1 Apr. 9, 2015

(51) Int. Cl.
| H04N 5/228 | (2006.01) |
| H04N 7/18 | (2006.01) |
| H04N 5/232 | (2006.01) |
| H04N 5/225 | (2006.01) |
| H04N 5/77 | (2006.01) |
| G11B 31/00 | (2006.01) |

(52) U.S. Cl.
CPC .............. *H04N 7/181* (2013.01); *G11B 31/006* (2013.01); *H04N 5/2251* (2013.01); *H04N 5/23258* (2013.01); *H04N 5/772* (2013.01)

(58) Field of Classification Search
USPC ................................. 348/222.1, 14.08, 36, 61
See application file for complete search history.

(56) References Cited

U.S. PATENT DOCUMENTS

| 7,271,827 | B2 | 9/2007 | Nister | |
| 2003/0215010 | A1* | 11/2003 | Kashiwa | ................... 375/240.02 |
| 2004/0219980 | A1 | 11/2004 | Bassett et al. | |
| 2005/0195277 | A1* | 9/2005 | Yamasaki | ........................ 348/61 |
| 2011/0128350 | A1* | 6/2011 | Oliver et al. | ..................... 348/36 |
| 2011/0164116 | A1 | 7/2011 | Gay et al. | |
| 2012/0032882 | A1 | 2/2012 | Schlachta et al. | |
| 2012/0118084 | A1* | 5/2012 | Klose et al. | ................... 73/865.4 |
| 2012/0262558 | A1 | 10/2012 | Boger et al. | |

(Continued)

FOREIGN PATENT DOCUMENTS

| GB | 2395615 A | 5/2004 |
| GB | 2485534 A | 5/2012 |
| WO | 2008127316 A1 | 10/2008 |

OTHER PUBLICATIONS

International Search Report dated Nov. 25, 2014 counterpart of PCT/US2014/057449.

*Primary Examiner* — Yogesh Aggarwal
(74) *Attorney, Agent, or Firm* — Kenneth A. Haas

(57) ABSTRACT

An event in a public safety (PS) network is recorded by mounting a video recording device for capturing images in a field of view (FOV) on a PS person, by tracking the PS person's point of view (POV) by mounting a motion sensor on the PS person's head for joint movement therewith to generate an output direction control signal indicative of a direction along which the POV is directed; by determining a context of the event in which the PS person is engaged by generating from a context sensor an output context signal indicative of the context of the event; and by automatically controlling operation of the video recording device based on the context and control signals by controlling one of direction of the FOV, angle of the FOV, size of the images, and resolution of the images.

8 Claims, 4 Drawing Sheets

(56) References Cited

U.S. PATENT DOCUMENTS

| | | |
|---|---|---|
| 2012/0287274 A1 | 11/2012 | Bevirt |
| 2012/0320169 A1 | 12/2012 | Bathiche |
| 2013/0127980 A1* | 5/2013 | Haddick et al. ............ 348/14.08 |
| 2013/0242120 A1* | 9/2013 | Venkatraman et al. .... 348/208.4 |
| 2013/0344859 A1* | 12/2013 | Abramson et al. ............ 455/418 |

* cited by examiner

METHOD OF AND APPARATUS FOR AUTOMATICALLY CONTROLLING OPERATION OF A USER-MOUNTED RECORDING DEVICE BASED ON USER MOTION AND EVENT CONTEXT

FIELD OF THE DISCLOSURE

The present disclosure relates generally to a method of, and an apparatus for, automatically controlling operation of a user-mounted recording device, such as a video camera for capturing images of an event in which the user, such as a public safety (PS) person, is engaged, and, more particularly, to controlling camera operation based on the motion of the PS person and the context of the event being handled by the PS person in a PS network.

BACKGROUND

In an emergency or like incident or event, public safety (PS) personnel, such as police officers, firefighters, paramedics, emergency medical service technicians, disaster relief workers, military rescue personnel, and like first responders, are typically dispatched to an incident scene to remedy the emergency. These PS personnel typically utilize PS communication devices, both handheld and vehicle-portable, while working in the field. PS communication devices include, for example, land mobile radios (LMRs), such as handheld radios and/or vehicular radios, along with built-in and/or remote accessories, such as microphones, speakers, earpieces, headsets, and the like, to support wireless, two-way, voice and data communications. These primary, mission-critical PS devices and the infrastructure to support their operation are typically operated as part of a private, secure, and protected, proprietary PS network governed by a PS agency, e.g., a local government or department.

In such events, as well as many other circumstances in which non-PS personnel, e.g., security, retail, hospitality and social service personnel, are required to interact with the public in the course of their duties, it is beneficial, and often mandatory, to make an audio/video recording of the event for use as subsequent confirmation of exactly what transpired during the event. It has been proposed to support a video camera on a police officer and/or in a vehicle to capture and store images of the event for use as evidence to justify an arrest.

However, the operation of such cameras is very limited. The body-worn camera may be free-running and constantly recording, in which case, the working lifetime is limited when batteries are used to supply the power, and/or older captured images may be lost when the storage capacity is small and is overwritten, and/or images may be captured when nothing of interest is occurring. The body-worn camera may be actuated by pressing a record button, but there may be situations where the officer either forgets, or is unable, to press the record button. The field of view (FOV) of the body-worn camera is typically unidirectionally directed in a forward direction, which is of little value in capturing images in other directions, i.e., behind the officer. Likewise, the vehicle-supported camera is unidirectionally directed in a forward direction and may not be pointed in the direction of most interest.

Accordingly, there is a need to alleviate the aforementioned drawbacks by automatically controlling, and expanding the scope of, the operation of a body-worn camera for capturing images of an event in which the user, such as a PS person, is engaged.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
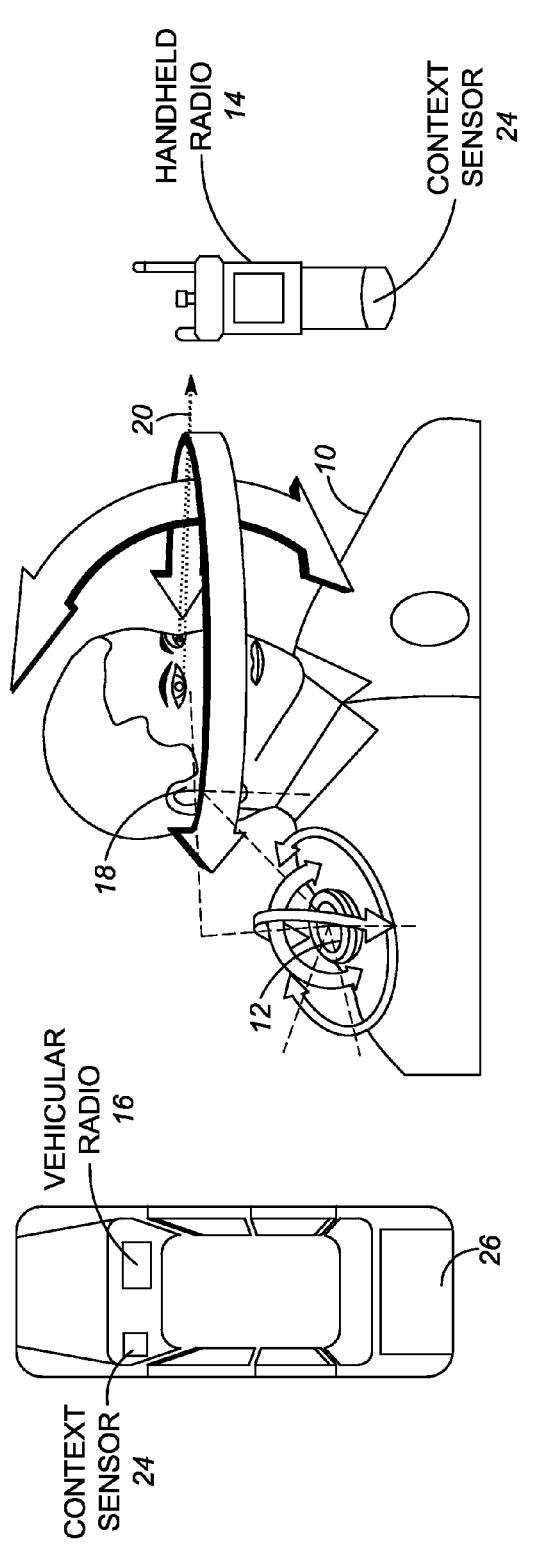
FIG. 1 is a pictorial view of components of an apparatus for controlling a user-mounted recording device in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The method and apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a method of recording an event. The method is performed by mounting on a user, e.g., a PS person, a recording device, such as an audio/video device, e.g., a camera for capturing images of the event over a field of view (FOV) and/or a microphone for capturing sounds of the event. An additional one or more such recording devices could be supported by the user. The method is further performed by tracking the user's point of view (POV), i.e., the direction or line-of-sight along which the user's eyes are directed, by mounting a motion sensor, e.g., a gyroscope, and/or an accelerometer, and/or a magnetic compass, on the user's head for joint movement therewith. An additional one or more such motion sensors could be supported by the user. The method is still further performed by determining a context or type of the event in which the user is engaged, and by automatically controlling operation of the recording device based on the determined context and the tracked POV.

More particularly, the motion sensor generates an output direction control signal indicative of a direction along which the POV is directed. The determining is performed by mounting one or more context sensors on the user, and/or on a vehicle associated with the user, and/or on a communication device operated by the user. The context sensor(s), either alone or in combination, generate an output context signal indicative of the context of the event. The controlling is performed by controlling operation of the recording device based on the context signal and the control signal by controlling such operational parameters as, among other things, the direction of the FOV, and/or the angle of the FOV, and/or the size of the images, and/or the resolution of the images, and/or when to start and stop recording.

An apparatus, in accordance with another aspect of this disclosure, is operative for recording an event. The apparatus includes at least one recording device having a field of view (FOV) mounted on a user, at least one motion sensor mounted on the user's head for joint movement therewith to track the user's point of view (POV), a context service engine for determining a context of the event in which the user is engaged, and a controller for automatically controlling operation of the recording device based on the determined context and the tracked POV.

Turning now to the drawings, reference numeral 10 in FIG. 1 generally identifies a user on whose body is mounted a recording device 12 having a field of view (FOV). Although the user 10 has been depicted in FIG. 1 as a public safety (PS) person and, in particular, a police officer, it will be understood that other PS personnel, such as firefighters, paramedics, emergency medical service technicians, disaster relief workers, military rescue personnel, and like first responders could wear the recording device 12. Indeed, even non-PS personnel, such as security, retail, hospitality and social service personnel, could wear the recording device 12. Although the recording device 12 is depicted in FIG. 1 as being supported on the user's shoulder, it will be understood that the recording device 12 could be mounted and supported anywhere on the user 10. Although a single recording device 12 is depicted in FIG. 1, it will be understood that additional recording devices 12 could be mounted and supported anywhere on and by the user 10, including on equipment carried or worn by the user 10.

The PS user 10 typically utilizes PS communication devices, both handheld and vehicle-portable, while working in the field. Such PS devices include, for example, a land mobile radio (LMR), such as a handheld PS radio 14 and/or a vehicular PS radio 16 in a PS vehicle 26, along with remote accessories, such as built-in or remote microphones, speakers, earpieces, headsets, and the like, to support wireless, two-way, voice and data communications. These primary, mission-critical PS devices 14, 16 and the infrastructure to support their operation are typically operated as part of a private, secure, and protected, proprietary PS network governed by a PS agency, e.g., a local government or department, over bidirectional wireless links connected to a PS server. The recording device 12 is an audio/video device, e.g., a camera for capturing images of an event in which the PS user 10 is engaged, and/or a microphone for capturing sounds of the event. The recording device 12 is in bidirectional wireless communication with the PS network.

Figure 2:
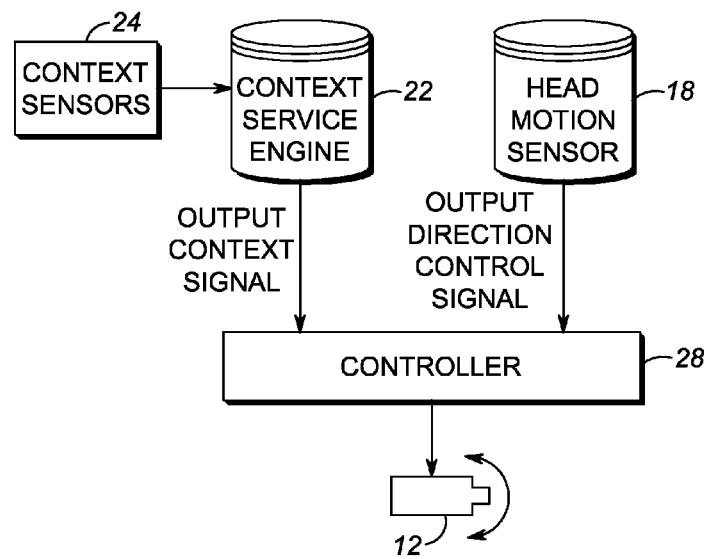
FIG. 2 is a block diagram of the components of FIG. 1.

In accordance with this disclosure, a motion sensor 18 is mounted on the user's head for joint movement therewith to track the user's point of view (POV) 20, i.e., the direction or line-of-sight along which the user's eyes are directed. The motion sensor includes one or more sensors, such as a gyroscope, and/or an accelerometer, and/or a magnetic compass. As shown in FIG. 2, the motion sensor 18 generates an output direction control signal indicative of a direction along which the POV is directed. As shown in FIG. 1, the motion sensor 18 is mounted in the user's ear. It will be understood that the motion sensor 18 could be mounted anywhere on the user's head. For example, the motion sensor 18 could be mounted in a hat or helmet on top of the user's head, or in a pair of glasses. In a preferred embodiment, the recording device 12 and the motion sensor 18 could be combined and jointly mounted in the pair of glasses. Although a single motion sensor 18 is depicted in FIG. 1, it will be understood that additional motion sensors 18 could be mounted and supported anywhere on and by the user 10, including on equipment carried or worn by the user 10.

In further accordance with this disclosure, a context of the event in which the user 10 is engaged is determined. By way of example, one type of event is a traffic stop in which the PS user 10 has stopped a driver's vehicle (see FIG. 3); another type of event is a foot chase in which the PS user 10 is running after a suspect (see FIG. 4); and still another type of event is a walk in which the PS user 10 is walking towards a suspect (see FIG. 5). Other type or contexts of events are, of course, contemplated by this disclosure.

The context of an event is determined by a context service engine 22, which is advantageously constituted as a programmed microprocessor. For example, one or more context sensors 24 may be positioned on the PS user 10, and/or on the PS vehicle 26, and/or on the PS radio 14, to advise the PS network of the context of the event. The PS user 10 may depress a button on the handheld radio 14 to advise the PS network of the context of the event, e.g., an emergency. The PS user 10 may simply call a call center on the PS network with the handheld radio 14 to advise the PS network of the context of the event. One of the context sensors may send global positioning satellite (GPS) information to the PS network. The context service engine 22 processes the outputs of the context sensors 24, as described below, and generates an output context signal indicative of the context of the event.

A controller or programmed microprocessor 28 receives and processes the output context signal and the output direction control signal, and automatically controls operation of the recording device 12, as described below, based on the determined context and the tracked POV. Such operational parameters as the direction of the FOV, and/or the angle of the FOV, and/or the size of the images, and/or the resolution of the images, and/or when to start and stop recording, among others, are so controlled.

Figure 3:
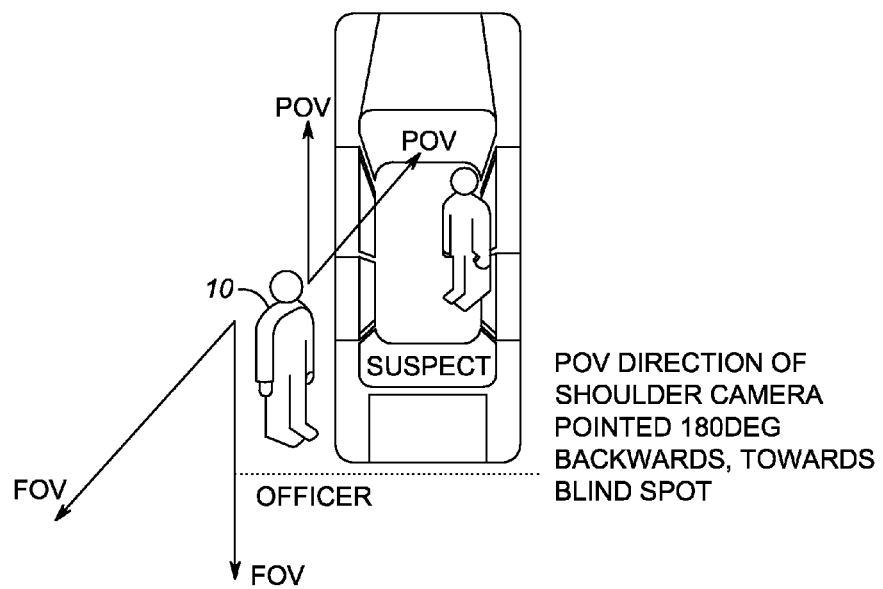
FIG. 3 is a pictorial view of how the apparatus of FIG. 1 is controlled in one event context.

Turning now to the traffic stop example of FIG. 3, a context sensor 24, advantageously constituted as a motion sensor, in the PS vehicle 26 may sense that the PS vehicle 26 has stopped, and another context sensor 24 in the PS vehicle 26 may sense that the driver's side door has opened and closed, and still other context sensors 24 on the PS radio 14 or on the PS user 10, may all be interpreted by the context service engine 22 that the event at issue is a traffic stop. In this case, as the PS user approaches the driver's vehicle, the context service engine 22 instructs the controller 28 to control the recording device 12 and, for example, enter a panoramic mode in which the FOV is 360 degrees so that a recording can occur completely around the PS user 10. When the PS user is at the driver's vehicle, the output of a context sensor 24 on the PS user 10, advantageously constituted as a proximity sensor, is processed by the context service engine 22 that, in turn, instructs the controller 28 to control the recording device 12 and, for example, enter a rear view recording mode in which the FOV is pointed rearwardly to monitor the back of the PS user 10. Thereupon, when the PS user 10 looks down at the driver, or at the driver's license, then the head sensor 18 generates the output direction control signal that instructs the controller 28 to control the recording device 12 and, for example, enter a front view recording mode in which the FOV is pointed forwardly to monitor the front of the PS user 10, and advantageously capture an image of the driver and the license. Thereupon, when the PS user 10 walks away from the driver's vehicle, the output of a context sensor 24 on the PS user 10, advantageously constituted as a proximity or motion sensor, is processed by the context service engine 22 that, in turn, instructs the controller 28 to control the recording device 12 and, for example, enter a rear view recording mode in which the FOV is pointed rearwardly to monitor the back of the PS user 10, or to stop recording. These actions are also set forth below in the flow chart of FIG. 6. Other variations are, of course, contemplated.

Figure 4:
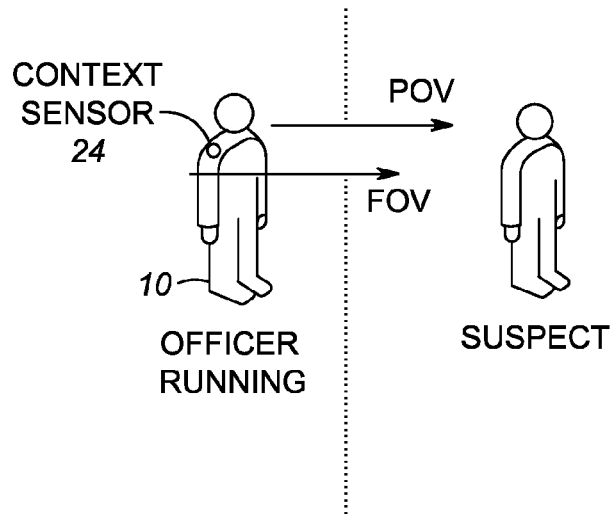
FIG. 4 is a pictorial view of how the apparatus of FIG. 1 is controlled in another event context.
Figure 5:
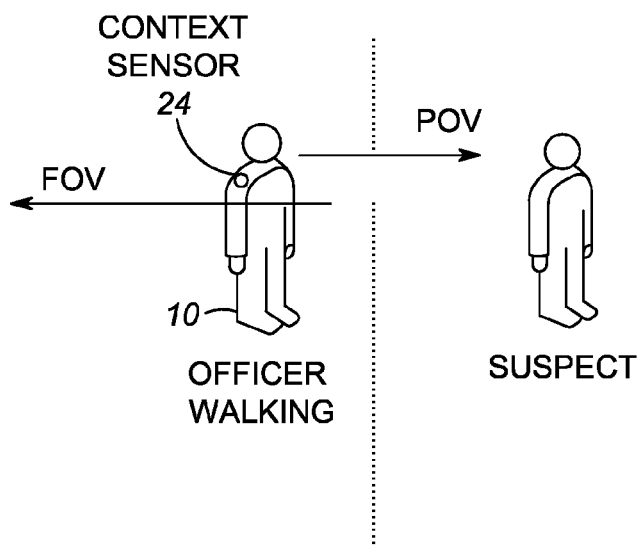
FIG. 5 is a pictorial view of how the apparatus of FIG. 1 is controlled in still another event context.

Turning now to the foot chase example of FIG. 4, a context sensor 24, advantageously constituted as a motion sensor, on the PS user 10, senses that the PS user 10 is running and instructs the controller 28 to control the recording device 12 and, for example, enter a front view recording mode in which the FOV is pointed forwardly to monitor the front of the PS user 10. In the walking example of FIG. 5, a context sensor 24, advantageously constituted as a motion sensor, on the PS user 10, senses that the PS user 10 is walking and instructs the controller 28 to control the recording device 12 and, for example, enter a rear view recording mode in which the FOV is pointed rearwardly to monitor the back of the PS user 10. In these examples, the context sensor 24 could be configured as biometric sensors, in which case, running or walking could be determined by monitoring the pulse rate of the PS user 10.

Thus, the context service engine 22 and the head sensor 18 together intelligently control the recording device 12. The context service engine 22 serves as a macro-controller for coarse adjustment, and the head sensor 18 serves as a micro-controller for fine adjustment. Together, they determine when, where, and how to record. The FOV can be in the same direction, in an opposite direction, in a perpendicular direction, or in a panoramic direction, as the POV. The recording device 12 can be instructed to capture images with a single encode, or with a dual encode. The context sensor 24 in any of the examples could also be configured as microphones in which the PS user 10 advises the PS network of the context of an event by speaking into the microphone and identifying the event.

Figure 6:
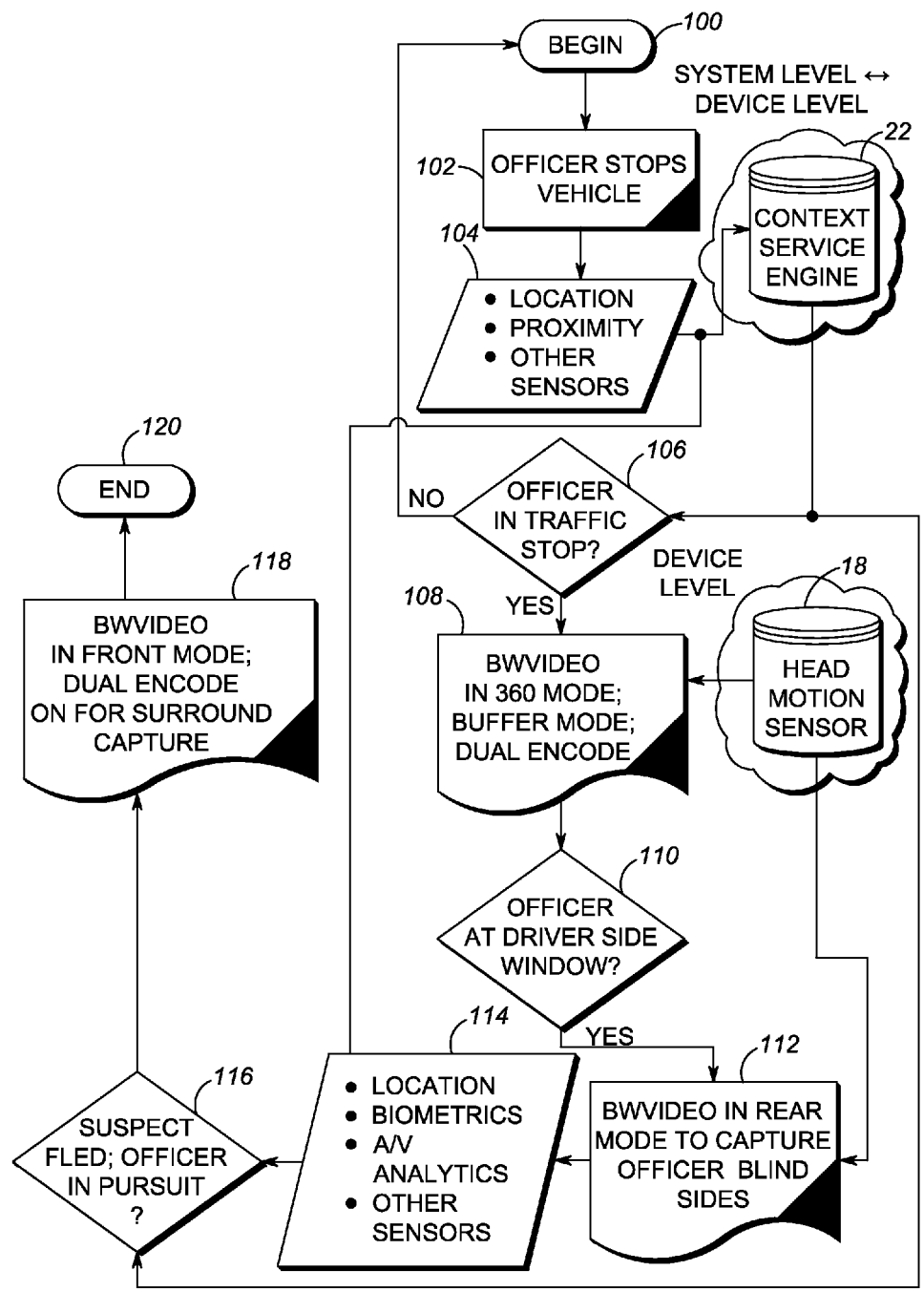
FIG. 6 is a flow chart depicting the steps performed in a method of controlling a user-mounted recording device in accordance with the present disclosure.

Turning now to the flow chart of FIG. 6, the method is initialized and ready to begin operation at step 100. Thereupon, the PS user 10 stops a driver's vehicle at step 102. The aforementioned context sensors 24 generate outputs at step 104 which are received and processed by the context service engine 22, which determines whether the PS user 10 is indeed in a traffic stop at step 106. If not, then the method returns to step 100. If so, then the recording device 12 is instructed by the context service engine 22 via the controller 28 to control operational parameters of the recording device 12 at step 108. These operational parameters may include whether the video is in a color or in black-and-white (BW) mode, or whether the video is in a 360 degree mode, or a buffer mode, or a single or dual encode mode. The head motion sensor 18 generates its output direction control signal for input to the controller 28.

Together, the direction control signal and the context signal are employed to instruct the controller 28 to control the recording device 12 to enter a mode in which the PS user 10 is located at a side window of the driver's vehicle at step 110. If the PS user is indeed located adjacent the driver's vehicle, then the recording device 12 is instructed to enter the rear recording mode at step 112. Other context sensors, such as a location sensor, a biometrics sensor, an audio/video analytic sensor, or other sensors, may be employed at block 114 to change the operational mode. For example, if the suspect is fleeing, and the PS user 10 is in pursuit as determined at decision block 116, then the recording device 12 is instructed to enter the front recording, black-and-white, dual-encode, full surround mode at block 118, after which the system is returned to a ready position at block 120.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of recording an event, the method comprising:
   determining if a user is walking or running via a body-worn motion sensor;
   instructing a body-worn camera to enter a rear-viewing mode or a front-viewing mode based on whether or not the user is walking or running, wherein the rear-viewing mode is entered when the user is walking and the front-viewing mode is entered when the user is running.

2. The method of claim 1, wherein the body-worn camera is mounted on the user's body at a location remote from the user's head.

3. The method of claim 1, wherein the motion sensor comprises one of a gyroscope, an accelerometer, and a magnetic compass.

4. The method of claim 1, the body-worn camera comprises a video camera.

5. An apparatus comprising:
   a body-worn motion sensor determining if a user is walking or running;
   a body-worn camera entering a rear-viewing mode or a front-viewing mode based on whether or not the user is walking or running, wherein the rear-viewing mode is entered when the user is walking and the front-viewing mode is entered when the user is running.

6. The apparatus of claim 5, wherein the body-worn camera is a video camera for capturing images.

7. The apparatus of claim 5 wherein the motion sensor is one of a gyroscope, an accelerometer, and a magnetic compass.

8. The apparatus of claim 5, the body-worn motion sensor and the body-worn camera communicate over wireless communications channels.

* * * * *

UNITED STATES PATENT AND TRADEMARK OFFICE
CERTIFICATE OF CORRECTION

PATENT NO. : 9,083,860 B2  
APPLICATION NO. : 14/049835  
DATED : July 14, 2015  
INVENTOR(S) : Shervin Sabripour et al.

Page 1 of 1

It is certified that error appears in the above-identified patent and that said Letters Patent is hereby corrected as shown below:

IN THE TITLE PAGE

In Item (71), under "Applicant," in Column 1, Line 1, delete "INC," and insert -- INC., --, therefor.

In Item (72), under "Inventors," in Column 1, Line 2, delete "L" and insert -- L. --, therefor.

In Item (72), under "Inventors," in Column 1, Line 3, delete "T" and insert -- T. --, therefor.

Signed and Sealed this  
Fifth Day of July, 2016

Michelle K. Lee  
*Director of the United States Patent and Trademark Office*